(12) United States Patent
Stanek et al.

(10) Patent No.: US 7,148,319 B2
(45) Date of Patent: Dec. 12, 2006

(54) ALKYLATION OF CROSSLINKED POLYMERS CONTAINING N OR AMINO OR AMMONIUM GROUPS

(75) Inventors: Michael Stanek, Linz (AT); Erich Steinwender, Linz (AT)

(73) Assignee: DSM Fine Chemicals Austria Nfg GmbH & Co KG, Linz (AT)

( * ) Notice: Subject to any disclaimer, the term of this patent is extended or adjusted under 35 U.S.C. 154(b) by 240 days.

(21) Appl. No.: 10/432,218

(22) PCT Filed: Nov. 20, 2001

(86) PCT No.: PCT/EP01/13383

§ 371 (c)(1),
(2), (4) Date: May 22, 2003

(87) PCT Pub. No.: WO02/48209

PCT Pub. Date: Jun. 20, 2002

(65) Prior Publication Data

US 2004/0028803 A1  Feb. 12, 2004

(30) Foreign Application Priority Data

Dec. 13, 2000 (AT) .................................. 2071/00

(51) Int. Cl.
*C08F 6/00* (2006.01)
(52) U.S. Cl. ...................... 528/480; 526/236
(58) Field of Classification Search ................ 528/480; 526/236
See application file for complete search history.

(56) References Cited

FOREIGN PATENT DOCUMENTS

| EP | 0 523 480 | 1/1993 |
|---|---|---|
| EP | 1 064 924 | 1/2001 |
| WO | 92/10522 | 6/1992 |
| WO | 95/34585 | 12/1995 |
| WO | WO 95/34585 | * 12/1995 |
| WO | 00/32656 | 6/2000 |
| WO | 00/63259 | 10/2000 |

* cited by examiner

*Primary Examiner*—Robert D. Harlan
(74) *Attorney, Agent, or Firm*—Wenderoth, Lind & Ponack, L.L.P.

(57) ABSTRACT

The invention relates to a method for alkylating cross-linked polymers containing N- or amino, ammonium or spirobicyclic ammonium groups. According to said method, the gelated polymers, obtained by polymerization and cross-linking, are a) optionally, deprotonated in water, an organic solvent or in a mixture of an organic solvent and water, by adding a base, b) optionally, washed once or more with water, an organic solvent or a mixture of an organic solvent and water, then c) one or more alkylators are added to the gel suspension which is stirred in water, an organic solvent or in a mixture of an organic solvent and water, at a temperature of between 5 and 160° C. at normal or increased pressure, with a base being added after a short mixing time and d) reprotonation is carried out using a mineral acid, optionally after one or more washing steps, resulting in the alkylated, cross-linked polymers containing N- or amino, ammonium or spirobicyclic ammonium groups, accordingly.

11 Claims, No Drawings

ALKYLATION OF CROSSLINKED POLYMERS CONTAINING N OR AMINO OR AMMONIUM GROUPS

The invention relates to a process for the efficient alkylation of polymers containing N or amino or ammonium groups, which are employed, for example, in medicine to lower the cholesterol level by means of binding of the bile acids or of bile acid salts.

The term alkylation is very comprehensive and as a definition includes the addition of an alkyl group to a molecule. Alkylation reactions play a crucial role in the chemical industry—in particular they have an especially important role in pharmaceutical chemistry, since, on the one hand, because of the often very high product price the efficiency of the reaction must be guaranteed and, on the other hand, the by-products formed in the reaction must be kept as low as possible because of the expensive purification steps.

The alkylation of gels and polymers is of special importance, since here not only the reaction kinetics described in the literature, such as for homogeneous solutions, apply but the alkylation is also subject to diffusion-controlled conditions to an increased extent.

In the processes hitherto disclosed in the prior art (e.g.: WO 98/43653; WO 99/33452; EP 0 909 768; WO 99/34786; WO 98/29107; WO 00/32656 etc.) for the alkylation of crosslinked polymers containing N or amino, ammonium or spirobicyclic ammonium groups, such as, for example, in the alkylation, for example, of polyallylamine hydrochloride crosslinked with epichlorohydrin, during the reaction considerable amounts of halogen-containing by-products are formed, such as, say, for example, chlorodecane and/or chloroquat, and in the use of methanol as a solvent in combination with aqueous sodium hydroxide solution in four equivalent portions by-products such as methoxydecane and/or methoxyquat etc. are formed. A further disadvantage of hitherto customary alkylation processes are the unsatisfactory alkylation yields and very long reaction times. Moreover, the considerable proportion of volatile organic impurities must be eliminated from the polymers or gels subsequently by a number of alcohol/NaCl washes or alcohol washes.

An object of the present invention was accordingly to find an alkylation method for crosslinked gels or polymers containing N or amino, ammonium or spirobicyclic ammonium groups which guarantees short reaction times, high alkylation yields and a formation of by-products which is as low as possible.

Unexpectedly, it was possible to achieve this object by means of an alkylation method which includes not only the optimum alkylation conditions during the reaction, but also the preparation of the gel to be alkylated.

The invention therefore relates to a process for the alkylation of crosslinked polymers containing N or amino, ammonium or spirobicyclic ammonium groups, which is characterized in that it comprises optionally deprotonating the gelled polymers obtained by polymerization and crosslinking a) in water, an organic solvent or in an organic solvent/water mixture by addition of a base,
b) optionally washing the polymers 1 or more times with water, an organic solvent or an organic solvent/water mixture, then
c) adding one or more alkylators at atmospheric or elevated pressure at a temperature of between 5 and 160° C. to the gel suspension stirred in water, an organic solvent or in an organic solvent/water mixture, and, after a mixing time of 1 to 60 minutes adding a base continually or in plural portions in such a way that the pH is between 8 and 13.5, and
d) subsequently carrying out the reprotonation by means of a mineral acid, if appropriate after one or more washing steps, whereby the correspondingly alkylated, crosslinked polymers containing N or amino, ammonium or spirobicyclic ammonium groups are obtained. In the process according to the invention, crosslinked polymers containing N or amino, ammonium or spirobicyclic ammonium groups are alkylated.

These polymers are polymers which are described, for example, in WO 00/32656, WO 00/38664, WO 99/33452, WO 99/22721, WO 98/43653, U.S. Pat. No. 5,624,963 and U.S. Pat. No. 5,496,545.

Suitable polymers for the alkylation process according to the invention are, in particular, cationic polymers. The cationic polymers include, inter alia, those polymers which contain an amine N atom, such as, for example, primary, secondary or tertiary amine groups or salts thereof, quaternary ammonium groups and/or spirobicyclic ammonium groups. Additional cationic groups include amidino, guanidino, imino etc. The cationic polymer is distinguished in that it has a positive charge at physiological pH.

Examples of suitable cationic polymers include polyvinylamines, polyallylamines, polydiallylamines, polyvinylimidazoles, polydiallylalkylamines, polyethylenimines etc., and also polymers comprising the repeating units disclosed in, for example, WO 00/32656, page 7f.; WO 98/43653, page 4f.; U.S. Pat. No. 5,496,545, column 2 to 4; U.S. Pat. No. 5,624,963; WO 98/29107 etc.

The polymers employed are additionally crosslinked. The crosslinking can in this case be carried out even during the polymerization or else also only following the polymerization. Suitable crosslinking agents include the crosslinking agents known from the references already cited. Examples of these are epichlorohydrin, succinyl dichloride, ethylenediamine, toluene diisocyanates, diacrylates, dimethacrylates, methylenebisacrylamides, dichloroethane, dichloropropane, etc.

The polymers employed for the process according to the invention additionally have negatively charged counterions. These counterions can be organic or inorganic ions or combinations thereof. Suitable counterions likewise include the counterions disclosed in the prior art already cited. Examples of suitable inorganic ions are halides, in particular chloride, phosphates, phosphites, carbonates, bicarbonates, sulfates, bisulfates, hydroxides, nitrates, persulfates, sulfites and sulfides. Examples of suitable organic ions are acetates, ascorbates, benzoates, lactates, fumarates, maleates, pyruvates, citrates, dihydrogencitrates, hydrogencitrates, propionates, butyrates, oxalates, succinates, tartrates, cholates etc.

The polymers are prepared as in the prior art, for example as described in WO 99/33452, WO 99/22721, WO 98/43653, U.S. Pat. No. 5,624,963 and U.S. Pat. No. 5,496,545.

Following the polymerization, crosslinking and gelling time, the alkylation according to the invention of the polymer contained in gel form is then carried out. The gel to be alkylated is optionally additionally comminuted or cut before hand.

Also before the alkylation reaction, the optionally cut crude gel is washed with a water/base mixture, an organic solvent/base mixture or a mixture of organic solvents, water and base so that the gel is present in completely or partially deprotonated form. If appropriate, the deprotonation can be dispensed with and the optionally cut crude gel is then washed only with water, an organic solvent or a mixture of organic solvent and water. Preferably, however, the polymer is deprotonated.

Step a) is carried out here at a temperature of 1° C. to 100° C., preferably at 5 to 90° C., particularly preferably at 10 to 40° C., using water, preferably using completely deionized water, or a solvent or a mixture, and a base suitable for the deprotonation. Suitable solvents are $C_1$–$C_{10}$alcohols, formamide, dimethylformamide (DMF), tetrahydrofuran (THF), acetonitrile, dimethyl sulfoxide (DMSO) and hexamethylphosphoramide (HMPA). However, mixtures thereof or mixtures with water can also be employed. Preferably, however, a $C_1$–$C_{10}$alcohol is used.

The alcohols can in this case be linear or branched, such as, for example, methanol, ethanol, i-propanol, butanol.

Particularly preferably, $C_1$–$C_6$alcohol, in particular methanol, ethanol and i-propanol, are employed as solvents.

Suitable bases are hydroxides, such as, for example, NaOH, KOH, LiOH, Ca(OH)$_2$, NH$_4$OH, carbonates, such as, for example, Na$_2$CO$_3$, K$_2$CO$_3$ etc. NaOH, KOH or NH$_4$OH is preferably used.

The amount of base to be used differs greatly between the respective gels, and depends on the amount of counterions.

Per mol of counterions, 0.1 to 5 mol of base, preferably 0.5 to 3 mol and particularly preferably 0.7 to 2 mol of base, are added here. If desired, greater excesses of base can also be employed.

By further washing of the deprotonated gel (step b) with an organic solvent, a solvent mixture or water/organic solvent mixtures at a temperature from 1 to 100° C., the content of salts in the gel can be greatly reduced. Preferably, for further washing the solvent employed in step a) is used. Step b) can optionally be dispensed with, otherwise the deprotonated gel is washed 1 to 8 times. Preferably, the gel is washed one to three times. If appropriate, steps a) and b) can be dispensed with completely.

The alkylators are then added to the gel suspension stirred in water or solvent or solvent mixture. (Step c)

Alkylators are understood as meaning reactants which, when they are reacted with a crosslinked polymer, cause an alkyl group or a derivative thereof, such as, for example, a substituted alkyl group etc., to bind covalently to one or more of the N atoms in the polymer.

Suitable alkylators in this case are compounds of the formula RX, which contain an alkyl group or an alkyl derivative having 1 to 24 C atoms (R), which is bonded to a leaving group (X), such as are already known from the prior art already cited.

R is accordingly a linear, branched or cyclic alkyl radical having 1 to 24 C atoms, preferably having 4 to 20 C atoms, or an alkyl derivative, such as, for example, a $C_1$–$C_{20}$—, preferably $C_4$–$C_{20}$-hydroxyalkyl group, $C_7$–$C_{20}$-aralkyl group, $C_1$–$C_{20}$-, preferably $C_4$–$C_{20}$-alkylammonium group or $C_1$–$C_{20}$-, preferably $C_4$–$C_{20}$-alkylamido group.

X is an electrophilic leaving group, for example from the group consisting of the halides, such as, for example, chloride, bromide, fluoride, iodide, or, for example, a leaving group such as epoxy, tosylate, mesylate or triflate. The alkylator can in this case contain one or more leaving groups.

Examples of preferred alkylators are $C_1$–$C_{24}$-alkyl halides, such as, for example, n-butyl halide, n-hexyl halide, n-decyl halide, n-dodecyl halide, n-tetradecyl halide, n-octadecyl halide, etc., $C_1$–$C_{24}$-dihaloalkanes, such as, for example, 1,10-dihalodecane, etc., $C_1$–$C_{24}$-hydroxyalkyl halides, such as, for example, 11-halo-1-undecanol, etc., $C_1$–$C_{24}$-aralkyl halides, such as, for example, benzyl halide, substituted benzyl halides, etc., $C_1$–$C_{24}$-alkylepoxyammonium salts, such as, for example, glycidylpropyltrimethylammonium salts, etc., $C_1$–$C_{24}$-epoxyalkylamides, such as, for example, N-(2,3-epoxypropane)butyramide, N-(2,3-epoxypropane)hexanamide, etc., $C_1$–$C_{24}$-alkyl halide ammonium salts, such as, for example, (4-halobutyl)trimethylammonium salt, (6-halohexyl)trimethylammonium salt, (8-halooctyl)trimethylammonium salt, (10-halodecyl)trimethylammonium salt, (12-halododecyl)trimethylammonium salt, etc.

Preferred alkylators are bromodecane and 6-bromohexyltrimethylammonium bromide.

In the alkylation reaction, one or more alkylators can in this case be added.

The alkylators are employed in the process according to the invention depending on the desired degree of alkylation. The synthesis of colesevelam hydrochloride should, for example, yield a polymer structure in which approximately 12% of the amines of the polyallylamine structure are crosslinked, approximately 40% of the amines of the polyallylamine structure are provided with decyl groups and approximately 34% of the amines of the polyallylamine structure are provided with trimethylammoniumhexyl groups, and also approximately 14% of the amines of the polyallylamine structure remain as primary amines (Polymer Preprints 2000, 41(1), 735–736). The determination of the different degrees of alkylation can be determined very simply in comparison with a selected reference substance by analysis of the C/N ratio and the number of free amines (titratable amines). Thus, for example, for the synthesis of colesevelam hydrochloride according to the prior art, for instance, 0.16 (±4%) mol of monoquat and 0.15 (±4%) mol of bromodecane are employed for a standard batch of 187.5 g of moist crude gel; in the process according to the invention, for example the amount of the alkylators can be reduced at most to 0.1536 mol of monoquat and 0.1326 mol of bromodecane, which corresponds to a reduction by 15% of bromodecane and 8% of monoquat. The asymmetric modification of the alkylators lies in the fact that each alkylator is subject to different alkylation yields.

The addition of the alkylators is carried out at a temperature between 5 and 160° C. and may take place not only at atmospheric pressure but also at elevated pressure. When elevated pressure is employed, the gauge pressure is adjusted to 0.1–20 bar, preferably 0.1–5 bar and more preferably 0.1–2 bar.

Before or after the addition, for example, the gel suspended in the solvent can be heated to 25 to 160° C., preferably to 35 to 120° C. and particularly preferably to boiling temperature of the respective solvent, depending on the solvent.

After addition of the alkylator(s), the reaction mixture is additionally thoroughly mixed, the mixing time being between 1 and 60 minutes, preferably 5 to 50 minutes and particularly preferably 10 to 40 minutes. If desired, longer mixing times can also be kept to, but afford no additional advantage.

The continuous or quasi-continuous addition of base is then begun.

A suitable base for this, depending on the solvent used, is NaOH, KOH, NH$_4$OH, LiOH, Ca(OH)$_2$, Ba(OH)$_2$, NaH and NaNH$_2$. NaOH is preferably employed.

The base is best added such that the pH remains constant during the entire reaction time. Depending on the pH electrode and calibration of the electrode, the values may differ—therefore an optimum pH range of 8 to 13.5, preferably 10.5 to 11.5, is specified. Once the optimum amount of base has been determined according to the kinetics, it is then possible, according to calculation by means of the exponential equalization function, also to carry out the addition of base quasi-continuously in a number of portions (at least 6, preferably at least 16, particularly preferably more than 16, portions), but at different time intervals. Corresponding to the equalization function, a continuous addition of base can also be carried out polygonally.

Too high a pH or base content leads, on the one hand, to the increased formation of alkoxy impurities, such as, for example, methoxydecane, ethoxydecane, (6-methoxyhexyl)trimethylammonium bromide, etc., in the case of the use of an alcohol as a solvent; too low a pH or base content decreases the reaction rate and increases the formation of, for example, Cl-alkane impurities.

Thus in the alkylation, for example, of crosslinked polymers which contain hydrochloride ions, such as, for example, polydiallylamine hydrochloride or polyallylamine hydrochloride, using an alkylator where X=bromide only a continuous addition of, for example, NaOH corresponding to the kinetics or corresponding to the formation of hydrobromic acid leads to no hydrochloric acid being formed by the amine hydrochloride ions still present or the NaCl salt remaining in the gel, which then reacts with the alkylators to give undesired Cl-alkane compounds. Cl-alkane compounds and alkoxyalkane compounds must be eliminated from the gel after reaction has taken place by washing a number of times, for example, with alcohol or alcohol/NaCl solutions.

According to the invention, in comparison with the prior art, one or more washing steps can be dispensed with because of the contamination profile, which is lower by up to 70%.

The alkylation reaction is complete when at least 95 to 99% of the alkylators have reacted, which according to the invention takes place 30 to 50% more rapidly in comparison with the prior art.

After the end of the reaction, in step d) the gel is reprotonated in water, an organic solvent or in an organic solvent/water mixture by addition of an acid.

Suitable organic solvents are in this case linear, branched or cyclic $C_1$–$C_{10}$-alcohols having 1 to 3 OH groups, such as, for example, methanol, ethanol, isopropanol, n-propanol, n-butanol, sec-butanol, hexanol, ethylhexanol, cyclopentanol, cyclohexanol, cyclooctanol, cyclohexanediol, glycol, glycerol etc., and also ketones, such as, for example, acetone, methyl ethyl ketone, methyl isopropyl ketone, methyl isobutyl ketone, diisopropyl ketone, cyclohexanone etc., nitriles, such as, for example, acetonitrile etc. and ethers, such as, for example, tetrahydrofuran, methyl tert-butyl ether, dimethoxyethane, etc.

$C_1$–$C_4$-alcohols are preferred and methanol is particularly preferably employed. Organic solvents here are also understood as meaning mixtures of the solvents mentioned above.

Suitable acids for the reprotonation are all mineral acids and organic acids which lead to the counterions already mentioned.

These are, for example, HCl, HBr, $H_2SO_4$, $H_3PO_4$, $HNO_3$ etc. and formic acid, acetic acid, oxalic acid, citric acid, pyruvic acid, maleic acid, fumaric acid, propionic acid, tartaric acid etc.

The gel is in this case firstly stirred in water, the organic solvent, the mixture of various organic solvents or the solvent/water mixture. The stirring time is in this case a few minutes to a number of hours, preferably 1 to 60 minutes, particularly preferably for 5 to 30 minutes. If desired, longer stirring times are also possible. The temperature is between 1 and 100° C., preferably between 5 to 90° C. and particularly preferably between 10 to 40° C.

The mixture is then treated with that amount of acid which leads to the complete or partial reprotonation of the amines in the polymer.

If desired, the reprotonation of the alkylated gel, however, can also be carried out at the end of one or more alcohol and/or alcohol/salt, for example NaCl, washes and/or water and/or water/salt, such as, for example NaCl, washes.

In the case of the use of alkylators which carry quaternary ammonium groups, such as, for example, (6-bromohexyl)trimethylammonium bromide, in comparison with the prior art a large part of the corresponding bromide ions can be performed by chloride ions by washing less often with water/NaCl, since the total amount of various salts is lower due to elimination of hydrochloride ions before the start of the alkylation reaction.

Following the reprotonation and in the case of bromide/chloride exchange, excess NaCl can be eliminated in the gel by repeated washing with water. The moist gel is dried according to the prior art.

By means of the process according to the invention it is possible to alkylate crosslinked gels or polymers containing N or amino, ammonium or spirobicyclic ammonium groups in an extremely efficient manner, short reaction times, high alkylation yields and a formation of by-products which is as low as possible being guaranteed.

Preferably, the process according to the invention for the alkylation of crosslinked polyallylamine and polydiallylamine hydrochlorides having functional groups containing N or amino, ammonium or spirobicyclic ammonium groups is employed.

The advantages of the process according to the invention in this case in particular lie in the significantly lower formation of impurities, such as chlorodecane, methoxydecane, chloroqat and methoxyquat, and in the markedly reduced amount (up to 15% less consumption) of the amount of alkylator needing to be employed. Moreover, a result of the lower formation of impurities, fewer washing steps are as necessary in comparison with the prior art.

A further advantage is the higher throughput due to reduction of the reaction time by about 30–50% (from about 20 h, or 26 h according to the prior art, to 10–13 h).

EXAMPLE 1

Preparation of a Polyallylamine Hydrochloride Crosslinked With Epichlorohydrin, Alkylation and Washing:

Crosslinking:

1500 g (8.02 mol) of an aqueous 50% strength polyallylamine hydrochloride solution were introduced into a 4.5 l Schmizo and diluted with 2037 g of completely deionized water with stirring and nitrogen flushing. The mixture was then adjusted to a pH of between 10.0–10.4 at 10° C. using 393 g (4.92 mol) of sodium hydroxide solution (50% strength). The solution obtained was stirred for 60 minutes and in the course of this cooled to an internal temperature of 5° C. The reaction mixture was treated with 44.53 g (0.48 mol) of epichlorohydrin, stirred at 5° C. for 30 minutes and then drained into in a plastic vessel to gel. The yield was 100% of theory. After a gelling time of 24 hours, the gel was forced twice through a sieve having a mesh width of 1.5 mm.

Deprotonation and Washing of the Cut Crude Gel (Steps a and b):

187.5 g of cut gel (parallelepipeds having an edge length of about 2×2×2 mm) were introduced into a glass sinter funnel (glass frit G2; 14 cm Ø), treated with 337.5 g of methanol and 15 g of NaOH (50% strength), suspended with stirring for 20 minutes and then, after allowing to settle (about 15 min), the liquid was filtered off to the surface. The gel cake was then additionally treated 3 times with 310 g of methanol each time, stirred for 20 minutes and in each case the liquid was filtered off to the surface with suction.

Alkylation (Step c):

The methanol-moist crude gel (375 g) was introduced into a 500 ml Schmizo, made up to a total volume of 600 ml under a nitrogen atmosphere using about 125 g of methanol and the mixture was heated to 50° C. 46.9 g (0.155 mol) of (6-bromohexyl)trimethylammonium bromide in 25 g of methanol and 31.0 g (0.14 mol) of 1-bromodecane were then added to the heated gel suspension with stirring. After addition of the alkylators had taken place, the reaction solution was stirred under reflux for 8 hours.

From the time when refluxing commenced, corresponding to the table below, 23 g of sodium hydroxide solution (50% strength) were added either discontinuously after different time intervals but in equal portions (A), or continuously at equal time intervals but in different portions (B), or continuously after different time intervals but in equal portions (C).

| Discontinuous (A) | | Continuous (B) | | Continuous (C) | |
| --- | --- | --- | --- | --- | --- |
| Time intervals for next NaOH addition | NaOH 50% strength [g] | Time interval for NaOH addition | NaOH 50% strength [g] | Time interval for NaOH addition | NaOH 50% strength [g] |
| 0 min | 1.44 | 30 min | 4.17 | 13 min | 1.44 |
| 14 min | 1.44 | 30 min | 3.45 | 13 min | 1.44 |
| 14 min | 1.44 | 30 min | 2.86 | 13 min | 1.44 |
| 14 min | 1.44 | 30 min | 2.36 | 13 min | 1.44 |
| 14 min | 1.44 | 30 min | 1.96 | 14 min | 1.44 |
| 14 min | 1.44 | 30 min | 1.62 | 16 min | 1.44 |
| 16 min | 1.44 | 30 min | 1.34 | 18 min | 1.44 |
| 18 min | 1.44 | 30 min | 1.11 | 20 min | 1.44 |
| 20 min | 1.44 | 30 min | 0.92 | 25 min | 1.44 |
| 25 min | 1.44 | 30 min | 0.76 | 27 min | 1.44 |
| 27 min | 1.44 | 30 min | 0.63 | 29 min | 1.44 |
| 29 min | 1.44 | 30 min | 0.52 | 34 min | 1.44 |
| 34 min | 1.44 | 30 min | 0.43 | 45 min | 1.44 |
| 45 min | 1.44 | 30 min | 0.36 | 60 min | 1.44 |
| 65 min | 1.44 | 30 min | 0.30 | 70 min | 1.44 |
| 90 min | 1.44 | 30 min | 0.24 | 70 min | 1.44 |

After addition of the sodium hydroxide solution had taken place, the stirrer was switched off and the gel suspension was additionally refluxed for a further 2 hours.

Reprotonation (Step d)

The mixture was then cooled to 20° C. and the gel suspension was treated with 34.2 g of concentrated hydrochloric acid (36% strength) with stirring (20 minutes).

Washing of the Alkylated Gel:

The gel suspension obtained was in each case treated 4 times with stirring with 225 g of methanol and 34.2 g of 2 molar NaCl solution and, after a stirring time of 20 minutes, the liquid was filtered off to the surface. The gel cake was then washed 6 times with 525 g of 2 molar NaCl solution each time and 6 times with 490 ml of deionized water each time.

The gel cake obtained was dried at 60° C. and a vacuum of 20 mbar to a drying loss of at most 3%. 75.4 g of product having a dry substance content of 1.4% were obtained.

In comparison with the prior art, after the end of the alkylation reaction the content of organic impurities in the reaction solution can be decreased:

|  | Chlorodecane | Methoxydecane | Chloroquat | Methoxyquat |
| --- | --- | --- | --- | --- |
| Prior art | 3–4 g/l | 1.8–2.2 g/l | 5–6 g/l | 5–7 g/l |
| According to the invention | 0.5–0.8 g/l | 0.9–1.4 g/l | 1.8–2.8 g/l | 5–7 g/l |

In comparison with the prior art, the content of chlorodecane in the moist gel after the fourth methanol/NaCl wash is only more 600 to 800 ppm instead of 2500 to 3000 ppm.

A comparison example for the alkylation is found according to the prior art in the reference polymer preprints 2000, 41(1), pages 735–736.

The invention claimed is:

1. A process for the alkylation of crosslinked polymers containing an amine N atom which comprises:
    a) deprotonating a gelled polymer obtained by polymerization and crosslinking in water, an organic solvent or in an organic solvent/water mixture by addition of a base,
    b) optionally washing the gelled polymer one or more times with water, an organic solvent or an organic solvent/water mixture, then
    c) adding one or more alkylators at atmospheric or elevated pressure at a temperature of between 5 and 160° C. to a gel suspension formed by stirring said gel polymer in water, an organic solvent or in organic solvent/water mixture, and, after a mixing time of 1 to 60 minutes, adding the base continually or in plural portions in such a way that the pH is between 8 and 13.5, and
    d) reprotonating by means of a mineral acid, after one or more optional washing steps, whereby the correspondingly alkylated, crosslinked polymers containing an amine N atom is obtained.

2. The process as claimed in claim 1, wherein the polymers containing an amine N atom are crosslinked, cationic polymers which contain primary, secondary or tertiary amine groups or salts thereof and/or quaternary ammonium groups and/or spirobicyclic ammonium groups, amidino groups, guanidino groups or imino groups, and also negatively charged inorganic and/or organic counterions selected from the group consisting of halides, phosphates, phosphites, carbonates, bicarbonates, sulfates, bisulfates, hydroxides, nitrates, persulfates, sulfites and sulfides, acetates, ascorbates, benzoates, lactates, fumarates, maleates, pyruvates, citrates, dihydrogencitrates, hydrogen citrates, propinonates, butyrates, oxalates, succinates, tartrates and cholates.

3. The process as claimed in claim 1, wherein the polymers containing an amine N atom are crosslinked polyvinylamines, polyallylamines, polydiallylamines, polyvinylimidazoles, polydiallylalkylamines or polyethylenimines having suitable counterions.

4. The process as claimed in claim 1, wherein said gel employed in step a) optionally is comminuted or cut and treated at a temperature of 1 to 100° C. with water, an organic solvent from the group consisting of $C_1$–$C_{10}$-alcohol, formamide, dimethylformamide, tetrahydrofuran, acetonitrile, dimethyl sulfoxide and hexamethylphosphoramide or with a mixture thereof or with a mixture with water and a base suitable for deprotonation from the group consisting of NaOH, KOH, LiOH, Ca(OH)$_2$, NH$_4$OH, Na$_2$CO$_3$ and K$_2$CO$_3$, wherein 0.1 to 5 mol of base are added per mol of counterion.

5. The process as claimed in claim 1, wherein in step b) the gelled polymer is washed 1 to 3 times at a temperature of 1 to 100° C. with water or with an organic solvent selected from the group consisting of C$_1$–C$_{10}$-alcohol, formamide, dimethylformamide, tetrahydrofuran, acetonitrile, dimethyl sulfoxide and hexamethylphosphoramide or with a mixture thereof or with a mixture with water.

6. The process as claimed in claim 1, wherein in step c) one or more alkylators of the formula RX are added at a temperature between 5 and 1600C to the gelled polymer stirred in water, in an organic solvent from the group consisting of C$_1$–C$_{10}$-alcohol, formamide, dimethylformamide, tetrahydrofuran, acetonitrile, dimethy 1 sulfoxide and hexamethylphosphoramide or in a mixture thereof or in a mixture with water, wherein the formula RX R is a linear, branched or cyclic alkyl radical having 1 to 24 C atoms, a C$_1$–C$_{20}$-hydroxyalkyl group, a C$_7$–C$_{20}$-aralkyl group, a C$_1$–C$_{20}$-alkylammonium group or a C$_1$–C$_{20}$-aklylamido group and X is an electrophilic leaving group from the group consisting of fluoride, chloride, bromide, iodide, epoxy, tosylate, mesylate or triflate, the alkylator optionally containing one or more leaving groups.

7. The process as claimed in claim 6, wherein the suspended gel is heated to 35 to 120° C. before or after the addition of the alkylator.

8. The process as claimed in claim 1, wherein in step c) the base employed is NaOH, KOH, NH$_4$OH, LiOH, Ca(OH)$_2$, Ba(OH)$_2$, NaH and NaNH$_2$.

9. The process as claimed in claim 1, wherein in step d) the gel suspension from step c) is firstly stirred at 1 to 100° C. for a few minutes to a number of hours in water, the organic solvent or the solvent/water mixture, and is then treated with that amount of mineral acids or organic acids which leads to the counterions originally present in the polymer and to partial to complete reprotonation.

10. The process as claimed in claim 1, wherein the reprotonation in step d) is carried out after one or more alcohol and/or alcohol/salt washes and/or water and/or water/salt washes.

11. The process according to claim 1 wherein said amine N atom is present as an amino, ammonium or spirobicyclic ammonium group.

* * * * *